(12) United States Patent
Stoll et al.

(10) Patent No.: US 7,398,588 B2
(45) Date of Patent: Jul. 15, 2008

(54) SOI COMPONENT COMPRISING MARGINS FOR SEPARATION

(75) Inventors: Oliver Stoll, Reutlingen (DE); Franz Laermer, Weil Der Stadt (DE); Gilbert Moersch, Stuttgart (DE); Gottfried Flik, Leonberg (DE); Klaus Kuettner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 311 days.

(21) Appl. No.: 10/527,183

(22) PCT Filed: May 6, 2003

(86) PCT No.: PCT/DE03/01438

§ 371 (c)(1),
(2), (4) Date: Nov. 14, 2005

(87) PCT Pub. No.: WO2004/027367

PCT Pub. Date: Apr. 1, 2004

(65) Prior Publication Data

US 2006/0154448 A1 Jul. 13, 2006

(30) Foreign Application Priority Data

Sep. 6, 2002 (DE) ................................. 102 41 450

(51) Int. Cl.
*H01R 43/00* (2006.01)
*H05K 3/30* (2006.01)
*H05K 3/02* (2006.01)
*G01R 3/00* (2006.01)

(52) U.S. Cl. ............................. 29/595; 29/825; 29/832; 29/847

(58) Field of Classification Search ................. 29/592.1, 29/595, 825, 832, 846, 847
See application file for complete search history.

(56) References Cited

U.S. PATENT DOCUMENTS 5,296,741 A * 3/1994 Kim ........................... 257/723

(Continued)

FOREIGN PATENT DOCUMENTS

DE 42 41 045 5/1994

(Continued)

*Primary Examiner*—Peter Vo
*Assistant Examiner*—David P Angwin
(74) *Attorney, Agent, or Firm*—Kenyon & Kenyon LLP

(57) ABSTRACT

A method for producing a component is provided, in particular a deformation sensor, having a sensor element which includes at least one region that is sensitive with respect to expansion or compression, as well as electrical structures which are in connection therewith. To this end, a sacrificial layer is produced on or within a substrate and an activatable layer on top of the sacrificial layer, the sensitive region and at least a portion of the electrical structures being positioned on top or within an activatable layer, and a circumferential trench is produced around the region of the sensor element to be produced and having the sensitive region and the portion of the electrical structures, the trench being interrupted by at least one connecting point, which connects the region of the sensor element to the portion of the activatable layer lying outside the circumferential trench. This is followed by a removal of the sacrificial layer underneath the region of the sensor element, a fixation of the region of the sensor element with the aid of a holding device, rupturing of the connecting points and a transfer of the sensor element, fixated by the holding device, and connecting a carrier to the component as well as joining with a carrier to the component.

15 Claims, 4 Drawing Sheets

U.S. PATENT DOCUMENTS

| | | | |
|---|---|---|---|
| 5,597,767 A * | 1/1997 | Mignardi et al. | 438/14 |
| 5,882,532 A | 3/1999 | Field et al. | |
| 5,919,713 A * | 7/1999 | Ishii et al. | 438/464 |
| 6,214,639 B1 | 4/2001 | Emori et al. | |
| 6,332,359 B1 * | 12/2001 | Ueyanagi et al. | 73/514.33 |
| 6,341,769 B1 * | 1/2002 | Lin et al. | 269/21 |
| 6,387,778 B1 * | 5/2002 | Bonin et al. | 438/462 |
| 6,407,764 B1 * | 6/2002 | Susukida et al. | 347/209 |

FOREIGN PATENT DOCUMENTS

| | | |
|---|---|---|
| DE | 197 01 055 | 6/1998 |
| DE | 197 04 454 | 8/1998 |
| DE | 198 03 013 | 8/1999 |
| DE | 198 25 761 | 12/1999 |
| DE | 101 56 406 | 6/2003 |
| EP | 0 627 764 | 12/1994 |
| EP | 0 672 898 | 9/1995 |
| EP | 0 672 899 | 9/1995 |
| JP | 11-94 666 | 4/1999 |

\* cited by examiner

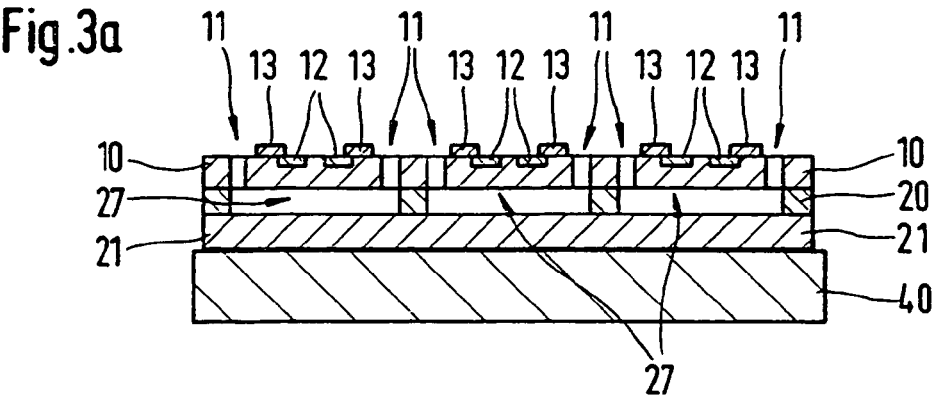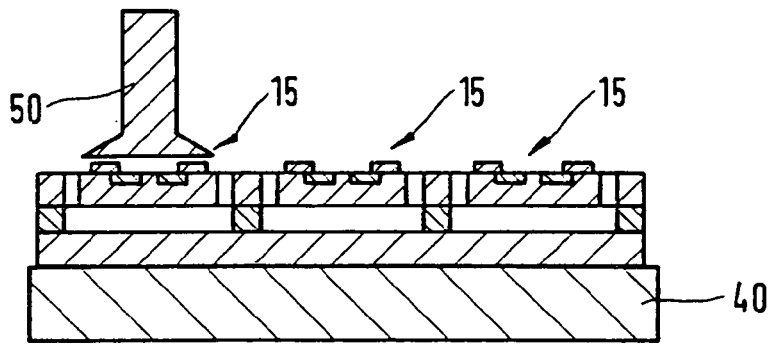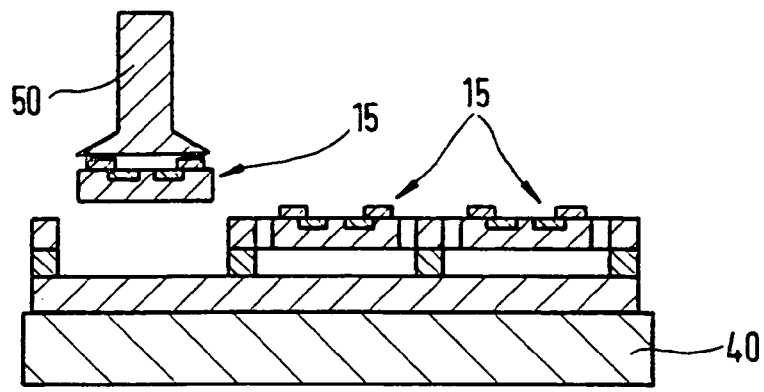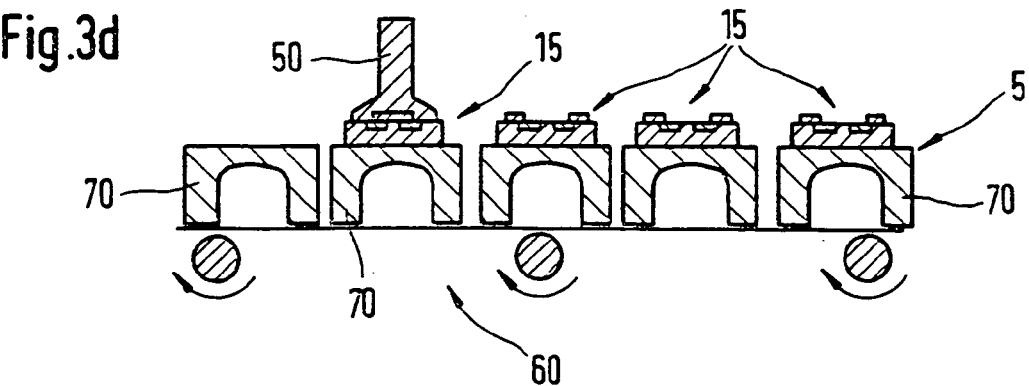

SOI COMPONENT COMPRISING MARGINS FOR SEPARATION

FIELD OF THE INVENTION

The present invention relates to a method for producing a component, in particular a deformation sensor, having a sensor element

BACKGROUND INFORMATION

German Published Patent Application No. 101 56 406 describes a method for separating and assembling strain gauge strips on a deformable membrane as they are used in high-pressure sensory systems, for instance for diesel common rail applications or in direct gasoline injection. The method described in the cited publication primarily focuses on the mass production of deformation sensors that are sensitive to force or pressure, for instance. A separation of the strain gauge strips, which are produced in a batch operation on a wafer, is accomplished with the aid of a setpoint rupture joint, which initially is produced in the form of a horizontal setpoint rupture joint by depositing a layer of porous silicon on a wafer. The actual strain gauge strips are then produced subsequently. To this end monocrystalline or polycrystalline silicon is grown on the porous layer and then regionally doped, so that the strain gauge strips are produced in the doped regions. Using the rupture joint, they may then be detached from the wafer with the grown layer. The separation of the strain gauge strips is finally implemented by sawing before they are installed on a membrane. German Published Patent Application No. 101 56 406 also describes the assembly procedure used for that purpose.

SUMMARY OF THE INVENTION

An object of the present invention was the provision of a method for producing a component having a sensor element, in particular a deformation sensor having a strain gauge strip, as an alternative to German Published Patent Application No. 101 56 406.

In contrast, the method according to the present invention has the advantage over the related art that the production or use of a porous layer as sacrificial layer is not required, so that the corresponding production steps, which are relatively time- and cost-intensive, may be omitted.

Furthermore, it is advantageous that the method according to the present invention is very suitable for the mass production of components having a sensor element, in particular deformation sensors having a strain gauge strip, i.e., it is suitable for batch production, and it may be integrated into existing production lines or methods for assembling the sensor elements on the component and for the joining of the sensor element to the component, in particular a steel component having a regionally provided membrane as it is used for pressure sensors and known from German Published Patent Application No. 101 56 406. In addition, however, the method according to the present invention is also suitable for the production and assembly of temperature sensors, magnetic sensors, or also as manufacturing method in the integrated electronics field, especially for the production and assembly of integrated electronic circuits, so-called ASIC's.

Furthermore, it is advantageous that the trench that surrounds the region of the sensor element to be produced, having the sensitive area and at least a portion of the electrical structures, is implementable with the aid of surface-micromechanical standard processes, such as anisotropic plasma etching of trenches according to German Patent No. 42 41 045 or by sacrificial-layer etching. These are established processes in the series production of surface-micromechanical components such as acceleration sensors or rate-of-rotation sensors.

In the method according to the present invention it is also advantageous that the setpoint rupture joints as connecting points extend over trenches produced perpendicularly to the surface of the substrate at a high aspect ratio, if possible, whereas the setpoint rupture joints provided according to German Published Patent Application No. 101 56 406 are present within the layer structure, i.e., in a vertical arrangement relative to the substrate surface, which is more complicated to produce and more susceptible to manufacturing fluctuations. In addition, German Published Patent Application No. 101 56 406 requires the produced sensor elements to first be separated by sawing prior to assembly or the joining to the metallic components. This sawing process may be omitted in the method according to the present invention.

Overall, the advantages of the method according to the present invention are, on the one hand, the excellent controllability of the utilized process technology, the comparatively low costs involved, the avoidance of disadvantages resulting from the production of a porous layer according to German Published Patent Application No. 101 56 406, and the complete design freedom regarding the geometric form of the sensor element to be produced, the circumferential trenches to be created and the arrangement of the electrical structures, since these are able to be defined by a photolithographic process, for example. Furthermore, due to the excellent controllability of the individual method steps, the method according to the present invention allows an outstanding control of the mechanical stability or the desired mechanical instability of the setpoint rupture joint.

For instance, it is especially advantageous that the thickness of the produced strain gauge resistors or strain gauge strips is able to be adjusted very precisely via the layer thickness of the utilized polycrystalline or monocrystalline silicon layer, the thicknesses of the strain gauge strips preferably being between 1 μm and 20 μm. In addition, the at least one joint, which is designed as setpoint rupture joint, may be adjusted in its mechanical stability in a very simple manner via the thickness of the activatable layer and/or the form of the joint in plan view.

To produce the circumferential trench, the use of an anisotropic plasma etching process as it is known from German Patent No. 42 41 045 has proven especially advantageous. In the process, trenches, which should be vertical and have a high aspect ratio, if possible, i.e., a height to width ratio of the trenches of preferably more than 10:1, are created from the surface of the activatable layer down to the depth of the sacrificial layer.

The removal of the sacrificial layer after production of the circumferential trench, whose depth reaches down to the sacrificial layer, may be implemented in an especially simple manner with the aid of a conventional isotropic etching process, such as vapor-phase etching with HF vapor. This removes the sacrificial layer below the sensor element to be produced, so that it is initially held above the cavity produced by removal of the sacrificial layer in a self-supporting manner with the aid of the at least one connecting point.

One possibility for further simplifying and improving the process control, in particular with respect to the produced layer thickness and the production of dislocations, results from the use of conventional SOI wafers ("silicon-on-isolator"), i.e., it is then possible to also utilize a monocrystalline activatable layer which exhibits poor dislocation.

Finally, it is advantageous if the evaluation electronics and/or control electronics assigned to the sensor element are/is at least partially integrated in the environment of the produced strain gauge strips or strain gauge resistors or, more generally, in the produced sensitive region. This results in further cost savings.

The method according to the present invention is particularly suited for the cost-effective production in a batch process of high-pressure sensors having a steel membrane, which may be used for pressures up to 1800 bar, and for the production of strain gauge strips, which may be utilized in a force sensor.

BRIEF DESCRIPTION OF THE DRAWINGS

FIG. 3a to FIG. 3d shows on the basis of FIG. 1d, the rupturing of a sensor element and the transfer and fixation of the ruptured sensor element on a carrier, in various method steps.

DETAILED DESCRIPTION OF THE EXEMPLARY EMBODIMENTS

FIG. 1 shows a substrate 21 such as a silicon wafer, on which a sacrificial layer 20 made of silicon oxide, for example, is located. An activatable layer 10, which is made of polycrystalline or monocrystalline silicon, for instance, is deposited on sacrificial layer 20. According to FIG. 1a, a sandwich structure with the layer sequence silicon-silicon oxide-silicon is therefore present. If a monocrystalline silicon layer is utilized as activatable layer 10, it is also possible according to FIG. 1a to use a conventional SOI wafer as sandwich structure.

Figure 1A:
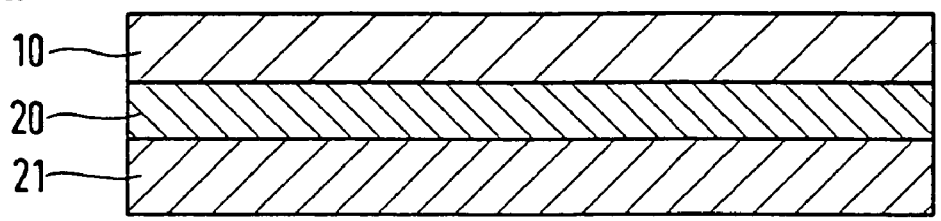
FIGS. 1a to FIG. 1d shows various method steps in the patterning of a sensor element out of a layer arrangement, in a section.
Figure 1B:
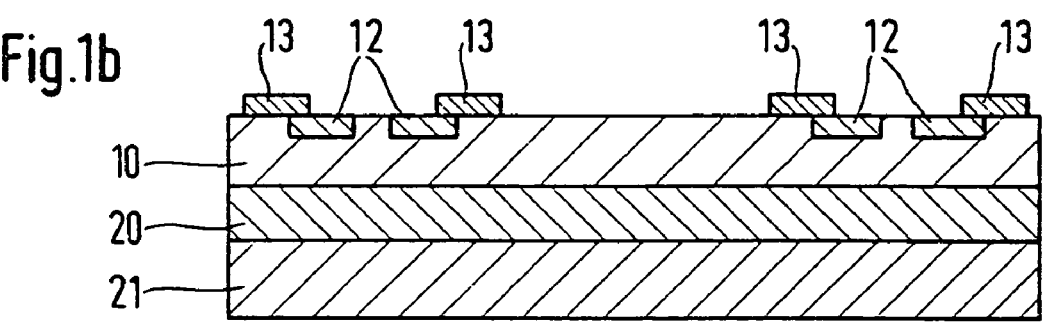

FIG. 1b elucidates the patterning procedure of activatable layer 10 in a second method step. To this end, using ion implantation or diffusion, a sensitive region 12 in the form of a strain gauge strip or a strain gauge resistor, for instance, is regionally produced on the surface of activatable layer 10. Simultaneously, in particular in a monocrystalline activatable layer 10, an evaluation electronics 72 may be integrated on activatable layer 10 at this stage already. Furthermore, it is likewise possible at this stage to apply a metallic coating on activatable layer 10 for a subsequent electrical contacting of sensitive region 12 or an evaluation circuit or control electronics. FIG. 1b shows, in particular, how, in addition to the plurality of sensitive regions 12, contact surfaces 13 in the form of metallic contact pads have been applied on activatable layer 10 as well.

Preferably already in the method step according to FIG. 1b, a Wheatstone bridge circuit 14 or one or several half-bridges of a Wheatstone bridge circuit 14 is/are created for each sensor element 15 to be produced, using a multitude of strain gauge resistors or strain gauge strips 12, and with the aid of electrical structures, in particular contact surfaces 13 and circuit traces, which are not shown.

Such a Wheatstone bridge circuit 14 includes a plurality of sensitive regions 12, in particular four strain gauge strips, and contact surfaces 13 or circuit traces, which are applied on or integrated in activatable layer 10 or in the region of the surface of activatable layer 10, and it optionally also includes an integrated evaluation circuit.

To protect contact surfaces 13, sensitive regions 12 and/or also a possibly already connected evaluation electronics or control electronics, it is also possible to deposit an additional passivation layer (not shown) on activatable layer 10. In the region of contact points 13, this passivation layer will then be opened in the further course or, alternatively, it already remains open when regions 13 are produced.

Figure 1C:
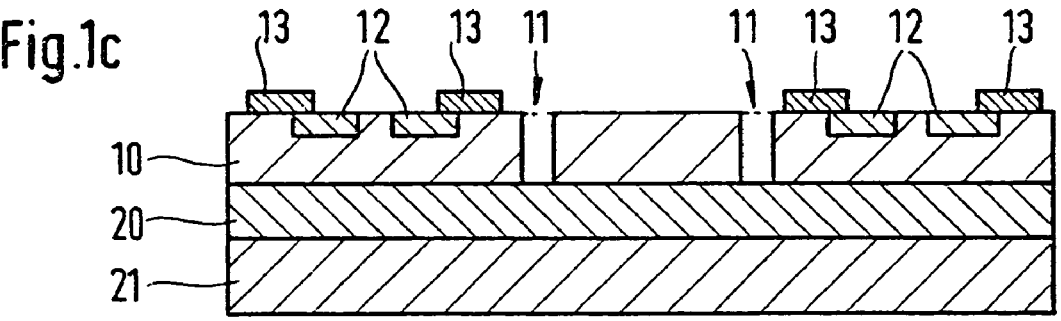

FIG. 1c illustrates how trenches 11 that reach down to sacrificial layer 20 are etched into activatable layer 10 in a further method step with the aid of a photolithographic standard process, among others. These trenches 11 are trenches that are implemented perpendicularly and at a high aspect ratio, if possible. At the same time, the final geometric form of the produced strain gauge strips in plan view is established too, utilizing this photolithographic standard process.

When trenches 11 are produced, it is important that the regions of activatable layer 10 that are enclosed by trenches 11 and which later are to form sensor element 15, include connecting points 25 which are embodied as setpoint rupture joints and connect these regions to parts of activatable layer 10 that lie outside the regions enclosed by trenches 11. A plurality of connecting points 25, such as two or four, are preferably provided.

After removal of sacrificial layer 20 below sensor element 15, connecting points 25 have the task of initially holding the specific region of activatable layer 10 enclosed by trenches 11 in a self-supporting manner. However, the weakest possible mechanical connection to the remaining sections of activatable layer 10, which is easily ruptured (setpoint rupture joint), should be maintained.

Figure 2:
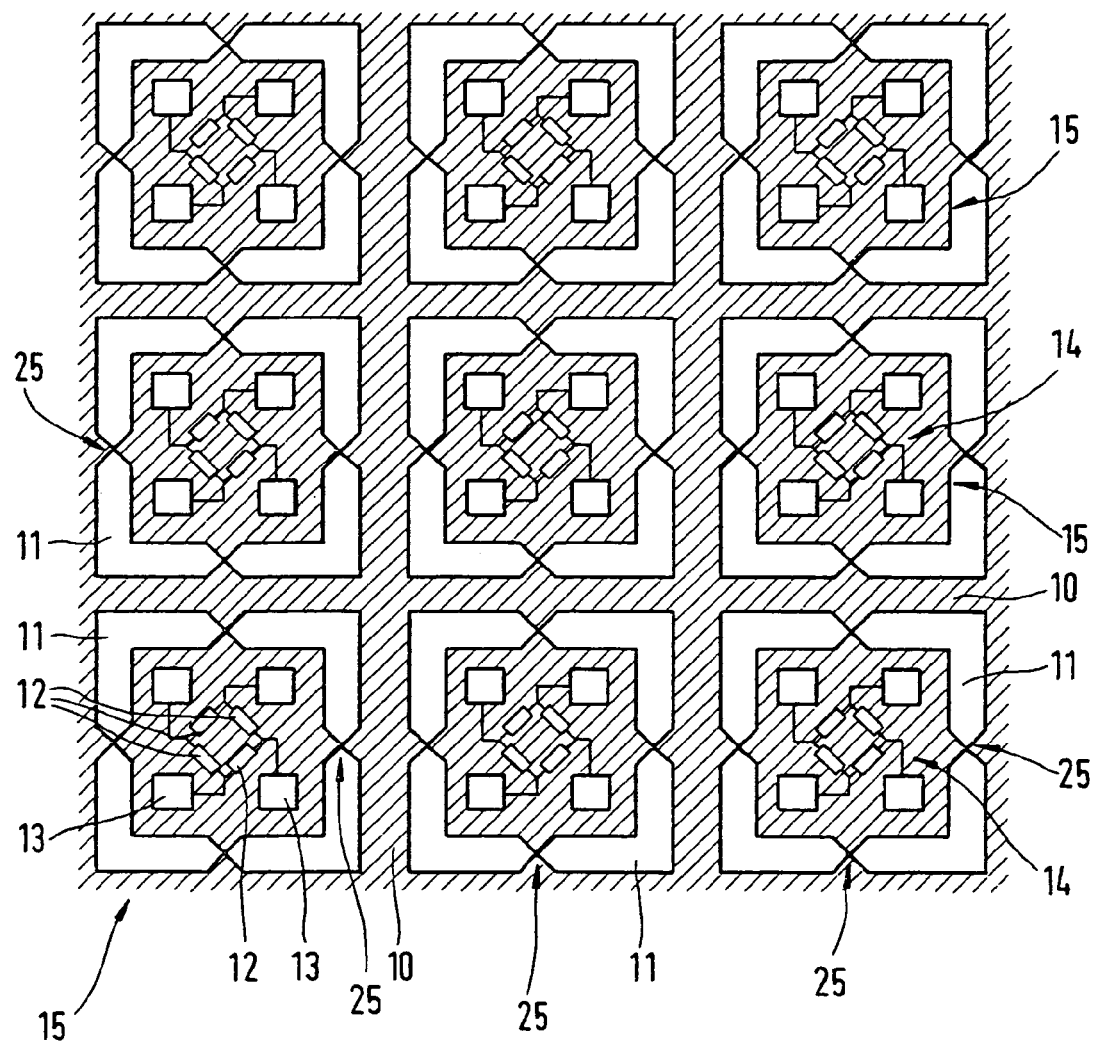
FIG. 2 shows a plan view of FIG. 1d.

Connecting points 25 as shown in FIG. 2 have a preferably triangular design in a plan view. However, other specific embodiments of connecting point 25 that are statically optimized for the individual case are also conceivable.

Following the discussed trench process, which is preferably carried out by anisotropic plasma etching, sacrificial layer 20 will be removed in the region below activatable layer 10 enclosed by trenches 11, such removal being implemented via produced trenches 11.

In the case of a silicon oxide sacrificial layer, this removal of the sacrificial layer is preferably implemented by HF vapor-phase etching.

Figure 1D:
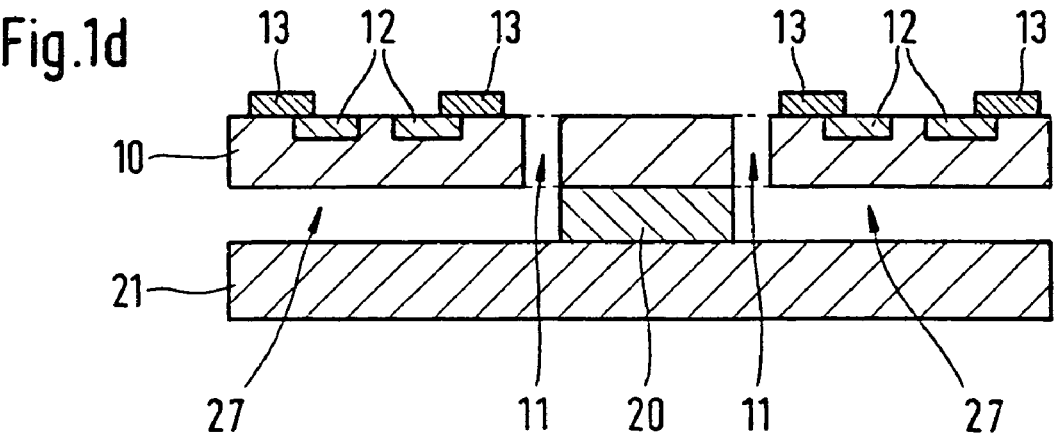

According to this method step, a structure according to FIG. 1d results, i.e., sensor element 15 to be produced, including assigned sensitive regions 12, is held above a cavity 27 produced by the removal of sacrificial layer 20 via connecting points 25 only.

The mechanical stability of connecting point 25 may be adjusted in a very simple manner via the thickness of monocrystalline or polycrystalline layer 10 deposited on sacrificial layer 20 and also by the form of connecting point 25 in a plan view.

FIG. 2 elucidates a plan view of FIG. 1d. It can be seen that each trench 11 is interrupted by four connecting points 25. Trenches 11 enclose one sensor element 15 in each case, which is connected to activatable layer 10 via connecting points 25 and held above cavity 27 in a self-supporting manner. Furthermore, it can be gathered from FIG. 2 that each sensor element 15 has four contact surfaces 13 via which the four sensitive regions 12 that are provided in each case are able to be controlled electrically or be read out, the sensitive regions being designed in the form of strain gauge strips and interconnected within sensor element 15 in the form of a Wheatstone bridge circuit 14 in each case.

Overall, according to FIG. 2 a multitude of sensor elements 15, which are subsequently separated, has been generated on a common substrate 21 according to FIG. 2.

In this context, FIG. 3a illustrates how the layer structure according to FIG. 1d, with sensor elements 15 held via connecting points 25 in a self-supporting manner, is initially supported on a clamping device 40 such as an electrostatic chuck. According to FIG. 3b, it is additionally illustrated how one of sensor elements 15 is fixated and lifted up with the aid of a gripper 50 such as a vacuum gripper using a preadjusted force, so that connecting points 25 are ruptured by the simultaneous holding of substrate 21 by clamping device 40. Sensor element 15 is thereby detached from the connection to substrate 21 or activatable layer 10, which is shown in FIG. 3c.

Sensor element 15, fixated by gripper 50, is then transferred to a carrier 70, which in the elucidated example is embodied as steel support or steel substrate having a membrane region 71 on the surface, so that sensor element 15, which is joined to carrier 70, may be used as deformation sensor. In this context FIG. 3d also shows that a multitude of carriers 70 is arranged on a tape and provided with a sensor element 15 in each case in a sequential manner. The method according to FIGS. 3a to 3d therefore represents a pick-and-place assembly principle, which is preferably implemented as continuous operation.

Furthermore, it should be mentioned that the adjustment of sensor elements 15 relative to carriers 70 on utilized transport device 60 is preferably implemented as described in DE 101 56 406.6 with the aid of gripper 50.

After sensor elements 15 have been assembled on carriers 70, sensor elements 15 being held on carriers 70 by an adhesive agent, for instance, a hardening of this adhesive agent takes place, for instance in a kiln.

As an alternative to the continuous operation according to FIG. 3c and transport device 60 utilized in the process, it is also possible to use an assembly method in which carriers 70 are held by a workpiece support during the adjustment and assembly of sensor elements 15.

It should also be mentioned that instead of a gripper 50 some other type of holding device may be used as well to grab the sensor element, rupture the connecting point and adjust and assemble sensor elements 15 on carrier 70.

An essential advantage of the elucidated method is the multitude of geometric forms of sensor elements 15 it is able to produce, which are thus able to be optimally adapted to the individual application case. In addition, sensitive regions 12 or the strain gauge strips may be arranged as needed, even in a different way, on carrier 70 or relative to membrane region 71.

Figure 4A:
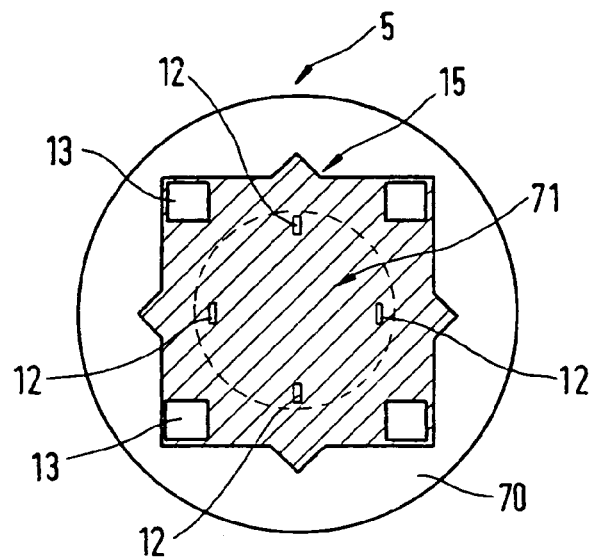
FIG. 4a to FIG. 4c shows different exemplary embodiments of the design of the sensor element joined to the component, in a plan view on the basis of FIG. 1d.

In this context FIG. 4a shows a plan view of a component 5 having a sensor element 15, which has been assembled and fixated on a steel carrier 70 having a membrane region 71 according to the procedure of FIG. 3d; the design of sensor element 15 corresponds to the design based on FIG. 2. In particular, according to FIG. 4a, four sensitive regions 12 in the form of strain gauges are arranged in the compression region of membrane 71, interconnected to Wheatstone bridge circuit 14 via circuit traces (not shown), and electrically contactable via contact surfaces 13.

If activatable layer 10 is made of monocrystalline silicon, the arrangement according to FIG. 4a makes use, in particular, that the longitudinal k-factor and the transversal k-factor of monocrystalline silicon have different signs.

Figure 4B:
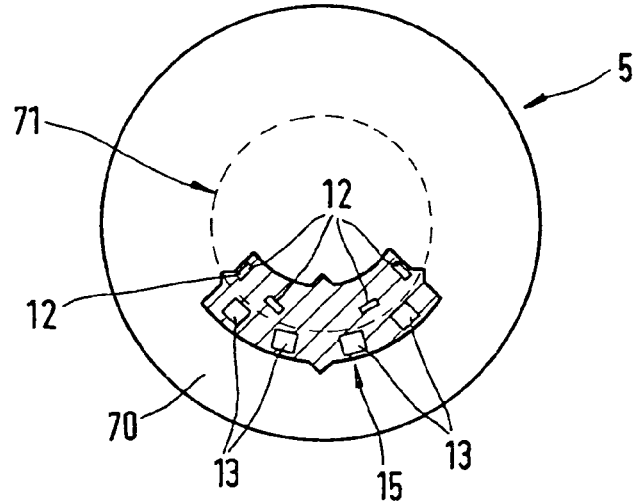

FIG. 4b elucidates an alternative specific embodiment for the design of sensor element 15 and its arrangement on carrier 70 including membrane region 71; this embodiment has the advantage of requiring less surface area at nearly identical functionality.

An electronic circuit 72 in the form of an evaluation electronics or a control electronics is preferably already integrated in sensor element 15 according to FIG. 4a or 4b. However, in this context attention must be paid to the most optimal decoupling of electronic circuit 72 with respect to mechanical stresses, since components such as transistors and resistors often have high voltage sensitivity.

Figure 4C:
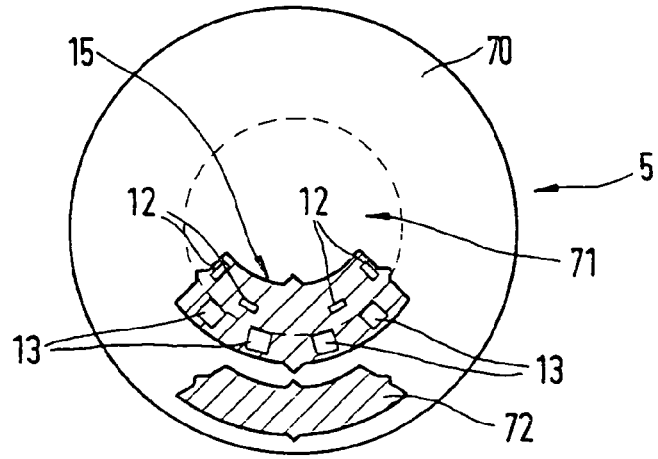

As an alternative, electronic circuit 72 may also be installed outside the deformation region of component 5, i.e., in particular outside membrane region 71. FIG. 4c shows an arrangement in this connection where, based on the arrangement of FIG. 4b, an electronic circuit 72 as evaluation electronics or control electronics has been affixed outside membrane region 71, which simultaneously is the deformation region of the deformation sensor formed by component 5 having the applied sensor element 15. Electronic circuit 72 is in contact with sensor element 15 via circuit traces, which are not shown. In this case it is preferably provided that electronic circuit 72 be implemented in the form of a separate chip.

In connection with the elucidated arrangements it should be pointed out in general that Wheatstone bridge circuit 14 and contact surfaces 13 are shown merely schematically. With respect to additional method details, reference is also made to the application German Published Patent Application No. 101 56 406.

What is claimed is:

1. A method of manufacturing a component, comprising:
providing a sensor element having at least one sensitive region that is sensitive with respect to one of strain and compression;
connecting a plurality of electrical structures to the sensor element;
producing a sacrificial layer on or within the substrate;
producing an activatable layer on top of the sacrificial layer;
producing the at least one sensitive region of the sensor element and at least a portion of the plurality of electrical structures on or within the activatable layer;
producing a circumferential trench in the activatable layer and around the at least one sensitive region of the sensor element, said circumferential trench is interrupted along the circumferential direction by only at least one connecting point connecting the at least one sensitive region of the sensor element to a portion of the activatable layer that lies outside the circumferential trench;
forming the at least one connecting point of the sensor element as a setpoint rupture joint;
adjusting the mechanical stability of the at least one connecting point corresponding to the setpoint rupture joint by modifying the thickness of the activatable layer at the at least one connecting point;
removing the sacrificial layer below the at least one sensitive region of the sensor element;
fixating the at least one sensitive region of the sensor element by a holding device;
rupturing the at least one connecting point;
transferring the at least one sensitive region of the sensor element by using the holding device; and
connecting the sensor element to a carrier.

2. The method as recited in claim 1, wherein the component includes a deformation sensor.

3. The method as recited in claim 1, wherein:
the sacrificial layer includes a layer of silicon oxide provided on the substrate,
the substrate includes silicon, and
the activatable layer includes one of a layer of polycrystalline silicon and a layer of monocrystalline silicon.

4. The method as recited in claim 1, further comprising:
producing the at least one sensitive region as one of a strain gauge resistor and a strain gauge strip one of on and in a region of one of a top side and a bottom side of a surface of the activatable region, the at least one sensitive region having a thickness of 1 μm to 20 μm.

5. The method as recited in claim 1, further comprising:
producing the at least one sensitive region by regional doping of the activatable layer, the regional doping including one of ion implantation and in-diffusion of foreign atoms.

6. The method as recited in claim 1, further comprising:
producing a contact region one of on and in a vicinity of the at least one sensitive region, the contact region including a superficial metal coating by which the at least one sensitive region is electrically contactable.

7. The method as recited in one claim 1, further comprising:
adjusting the mechanical stability of the at least one connecting point corresponding to the setpoint rupture joint via a form of the at least one connecting point in a plan view.

8. The method as recited in claim 1, further comprising:
producing the circumferential trench in a trench process that includes an anisotropic plasma etching process, in such a way that the circumferential trench reaches from a surface of the activatable layer down to the sacrificial layer in depth.

9. The method as recited in claim 1, further comprising:
following the production of the circumferential trench, removing the sacrificial layer below the sensor element by etching including vapor-phase etching with HF vapor in such a way that the sensor element is held above a cavity in a self-supporting manner by the at least one connecting point.

10. The method as recited in claim 1, further comprising:
producing the at least one sensitive region with a plurality of at least one of strain gauge resistors and strain gauge strips, the plurality of the at least one of strain gauge resistors and strain gauge strips being interconnected via the plurality of electrical structures to form one of a Wheatstone bridge circuit and a half-bridge of the Wheatstone bridge circuit.

11. The method as recited in one claim 1, further comprising:
producing at least a portion of the electrical structures, corresponding to one of evaluation electronics, control electronics, contact surfaces, and a bridge circuit, on one of the activatable layer and the at least one sensitive region.

12. The method as recited in one claim 1, wherein the rupturing of the at least one connecting point is implemented with the aid of a vacuum gripper that grabs the sensor element to be detached, and wherein the substrate is fixated during the rupturing by a holding device corresponding to an electrostatic clamping device.

13. The method as recited in claim 1, further comprising:
joining the sensor element to the carrier at least partially via one of a membrane region and a deformation region of the carrier, the carrier including a steel substrate.

14. The method as recited in claim 1, wherein:
a plurality of sensor elements is produced simultaneously on the substrate, and
the sensor elements are fixated by the holding device individually one after another, transferred after rupturing of the at least one connecting point, and connected to the carrier.

15. The method as recited in claim 1, wherein the ruptured sensor elements are adjusted relative to the carrier individually assigned thereto and are mounted thereon, in a continuous operation.

* * * * *